(12) United States Patent
Wilson et al.

(10) Patent No.: US 6,829,691 B2
(45) Date of Patent: Dec. 7, 2004

(54) SYSTEM FOR COMPRESSING/DECOMPRESSING DATA

(75) Inventors: Kenneth Mark Wilson, San Jose, CA (US); Robert B. Aglietti, San Jose, CA (US)

(73) Assignee: Hewlett-Packard Development, L.P., Houston, TX (US)

( * ) Notice: Subject to any disclaimer, the term of this patent is extended or adjusted under 35 U.S.C. 154(b) by 184 days.

(21) Appl. No.: 10/187,337

(22) Filed: Jun. 28, 2002

(65) Prior Publication Data
US 2004/0003196 A1 Jan. 1, 2004

(51) Int. Cl.$^7$ .............................................. G06F 12/02
(52) U.S. Cl. ...................................... 711/171; 711/154
(58) Field of Search ................................ 711/171, 173, 711/153, 154; 703/101

(56) References Cited

U.S. PATENT DOCUMENTS

| | | | | |
|---|---|---|---|---|
| 5,606,428 A | * | 2/1997 | Hanselman | ................. 358/404 |
| 5,654,703 A | * | 8/1997 | Clark, II | ...................... 341/51 |
| 5,864,652 A | * | 1/1999 | Murahashi | ................. 358/1.16 |
| 6,145,069 A | * | 11/2000 | Dye | ........................... 711/170 |
| 6,370,631 B1 | * | 4/2002 | Dye | ........................... 711/170 |
| 2003/0031247 A1 | * | 2/2003 | Takahashi et al. | .......... 375/240 |

* cited by examiner

Primary Examiner—Hiep T. Nguyen

(57) ABSTRACT

The present invention pertains to a system for performing data compression/decompression. The system may have a memory controller with compression/decompression logic. A first memory array may be coupled to the memory controller via a first bus and a second memory array may be coupled to the memory controller via a second bus. The system may also have logic for directing the transfer of data from the first memory array via the first bus to be processed by the compression/decompression logic and then transferred to the second memory array via the second bus.

30 Claims, 3 Drawing Sheets

SYSTEM FOR COMPRESSING/DECOMPRESSING DATA

TECHNICAL FIELD

The present invention relates to the field of computer memory management. Specifically, the present invention relates to a method and system for improving in-memory compression and decompression.

BACKGROUND ART

As the gap between hard drive access time and memory access time increases, it is increasingly desirable to locate more data in memory. This is increasingly important because the size of applications and data sets is increasing at a faster rate than the density of main memory. Furthermore, systems with multiprocessors may have many programs running simultaneously with each program having a relatively small number of pages of instructions and data in main memory. Hence, page faults may occur frequently. One way to increase the effective storage capacity of main memory is to compress its contents. However, conventional computer systems may be unable to efficiently manage the compressed data in main memory.

In typical computer operations, data can be stored in volatile memory in either compressed or uncompressed form. Therefore, for example, if a program requests data that was stored compressed, the data must be uncompressed before it is usable. Both compression and decompression may be performed in-line, for example, while in transit from a source to a destination. As computers have become faster, the speed demand on the compression/decompression process has increased enormously.

When, for example, a page of data is selected for compression or decompression, it is typically transferred from memory to a compression/decompression engine via a data bus that connects to the memory arrays. After processing in the compression/decompression engine, the data is transferred via the same bus back to memory. This requires having data, compressed and uncompressed, travelling in both directions on the same data bus. Consequently, this adds time, or latency, to the movement of the data as well as to the overall compression/decompression process. This is true even when the compression/decompression engine is located inline in the memory bus.

A number of techniques have been employed to work around the speed loss associated with both compression and decompression. For example, if the data is stored compressed in main memory and decompressed when a program requests the data, a conventional technique is to provide a cache of uncompressed data for data that is expected to be accessed with a high probability. This allows some of the data to bypass compression and avoid the latency associated with the compression/decompression processes. However, this requires additional cost for the cache and since the data is uncompressed requires more space than if stored uncompressed. Also, it is unavoidable that there will be cache misses, in which case, the compressed data must be run through the decompression engine, which as discussed is not performed efficiently in conventional systems.

Thus, a first problem with conventional methods of performing compression/decompression in main memory is failing to perform the compression/decompression process efficiently. A further problem with conventional methods is failing to take advantage of the speed of available compression engines.

DISCLOSURE OF THE INVENTION

The present invention pertains to a system for performing data compression/decompression. The system may comprise a memory controller having compression/decompression logic. A first memory array may be coupled to the memory controller via a first bus and a second memory array may be coupled to the memory controller via a second bus. The system may also have logic for directing the transfer of data from the first memory array via the first bus to be processed by the compression/decompression logic and then transferred to the second memory array via the second bus.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
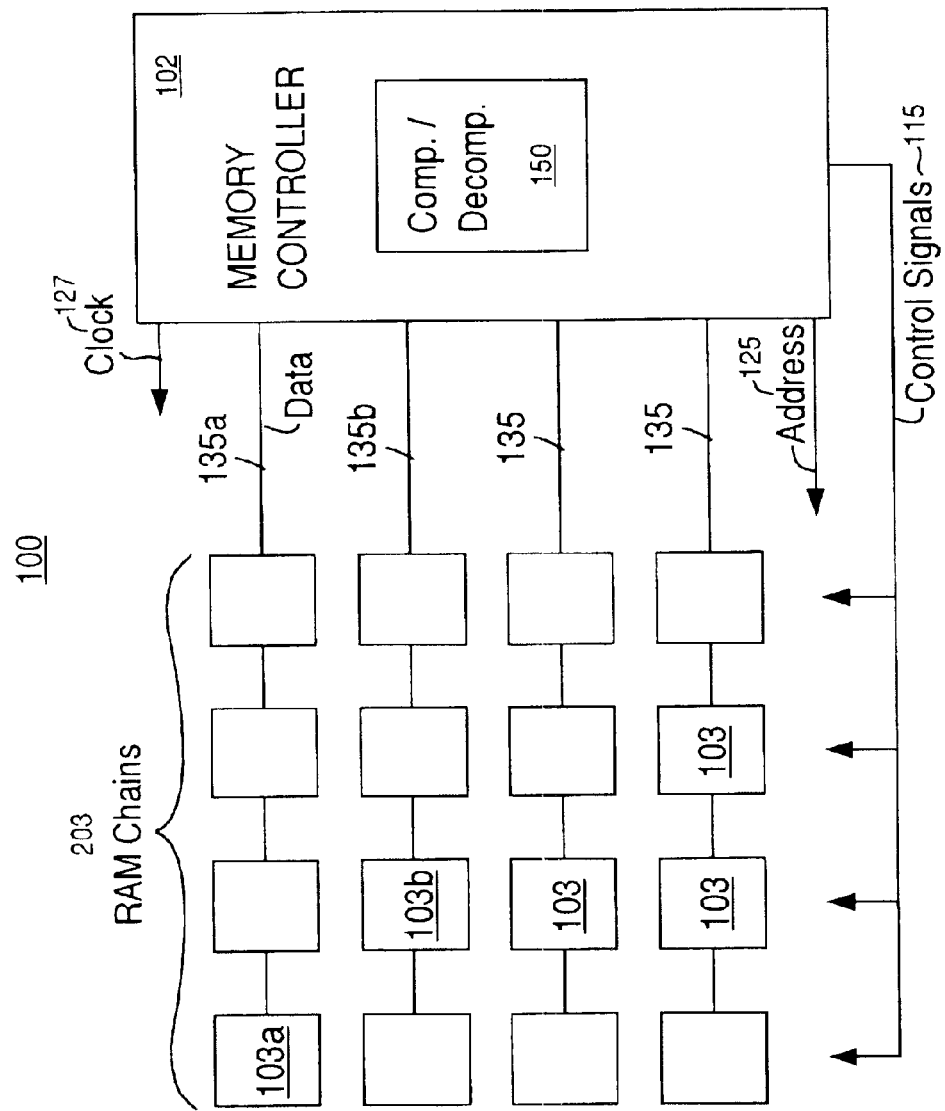
FIG. 1 illustrates a block diagram of a system for compressing/decompressing data, in accordance with embodiments of the present invention.

One embodiment of the present invention provides for a system for performing data compression/decompression. The system may comprise a memory controller having compression/decompression logic, which may be either hardware or software implemented. The memory array may have a number of chains of memory arrays coupled thereto via a number of busses. When the system is to perform a compression or a decompression of a unit of data (e.g., a page), the system transfers the data from a first memory array on a first bus to the memory controller, where it is fed into the compression/decompression logic. After processing, the data is transferred via a second bus to a second memory array. In this fashion, a portion of the data may be transferred in compressed form on one bus while another portion of the data is being transferred on another bus. Thus, the effective rate at which the data is transferred across the busses may be doubled versus conventional methods, which may use a common bus for at least a portion of the data transfer.

Embodiments of the present invention perform in-memory compression and decompression of computer data that fully exploit the speed of available compression engines and exert minimal impact on the speed and bandwidth of bus transactions. Furthermore, embodiments of the disclosed invention allow the efficient use of resources, such as compression/decompression engines themselves. Embodiments of the present invention require minimal buffering.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "entering," or the like, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage.

Referring now to FIG. 1, an embodiment provides for a system 100 for performing compression and decompression. The data may be stored compressed in main memory and the compression may be done near main memory (e.g., in a memory controller 102). Throughout this description, the term in-line compression/decompression may be defined as performing compression or decompression while data is en-route.

The system 100 may comprise a memory controller 102, which may issue a memory address signal 125, a clock signal 127, and control signals 115, such as, for example, a row access strobe (RAS) and column access strobe (CAS) when data stored in a memory array 103 is to be accessed. As the system 100 of this embodiment is to perform data compression in main memory (e.g., memory arrays 103), the memory controller 102 may have a compression/decompression engine 150. The compression/decompression engine 150 may be implemented in hardware or software. The compression/decompression engine 150 may be autonomous or may be controlled by an operating system (OS).

Still referring to FIG. 1, the system 100 may have two or more data busses 135 coupled to the memory controller 102. A data bus 135 may have one or more memory arrays 103 coupled thereto, thus forming memory chains 203. Thus, the system 100 may have two or more memory chains 203 coupled to the memory controller 102. The memory chains 203 may be implemented as a RAMBUS architecture; however, this is not required. The present invention is well suited to any architecture in which a memory controller 102 has access to data on a least two busses 135.

The memory controller 102 may be able to control more than one of the data busses 135 at a given point in time. The memory controller 102 may be able to simultaneously cause a data access to a first memory array 103a on a first bus 135a and a second memory array 103b on a second bus 135b. In this fashion, the memory controller 102 or other logic (e.g., an operating system) may direct that data from a first memory array 103a be transferred to the memory controller 102, where it may be processed by the compression/decompression engine 150. For example, the memory controller 102 may have logic to perform this function. Then, the memory controller 102 or other logic may direct that the processed data be transferred from the memory controller 102 to a second memory array 103b via the second bus 135b.

The data that is transferred to the memory controller 102 for processing by the compression/decompression engine 150 may be of any suitable size. For example, the data may be a page of data, multiple pages of data, less than a page, etc. While the memory controller 102 may issue signals (e.g., control signals 115, address signal 125, clock, etc.) to a memory array 103 to cause the data to be sent to or received from a bus 135, the memory controller 102 itself may or may not determine which memory array 103 (and which particular data in the memory array 103) is to be accessed. For example, an operating system or other logic may specify the memory locations.

In one embodiment of the present invention, a first data bus 135 may be dedicated to transferring compressed data, while a second data bus 135 may be dedicated to transferring uncompressed data. However, it is not required that a given data bus 135 be dedicated to either compressed or uncompressed data. In a like fashion, at least one of the memory arrays 103 on a given data bus 135 may be dedicated to storing compressed data. It may also be the case that at least one of the memory arrays 103 on a given data bus 135 may be dedicated to storing uncompressed data. However, a memory array 103 may also store both compressed and uncompressed data and may also store only compressed data at one time and only uncompressed data at another time.

Figure 2:
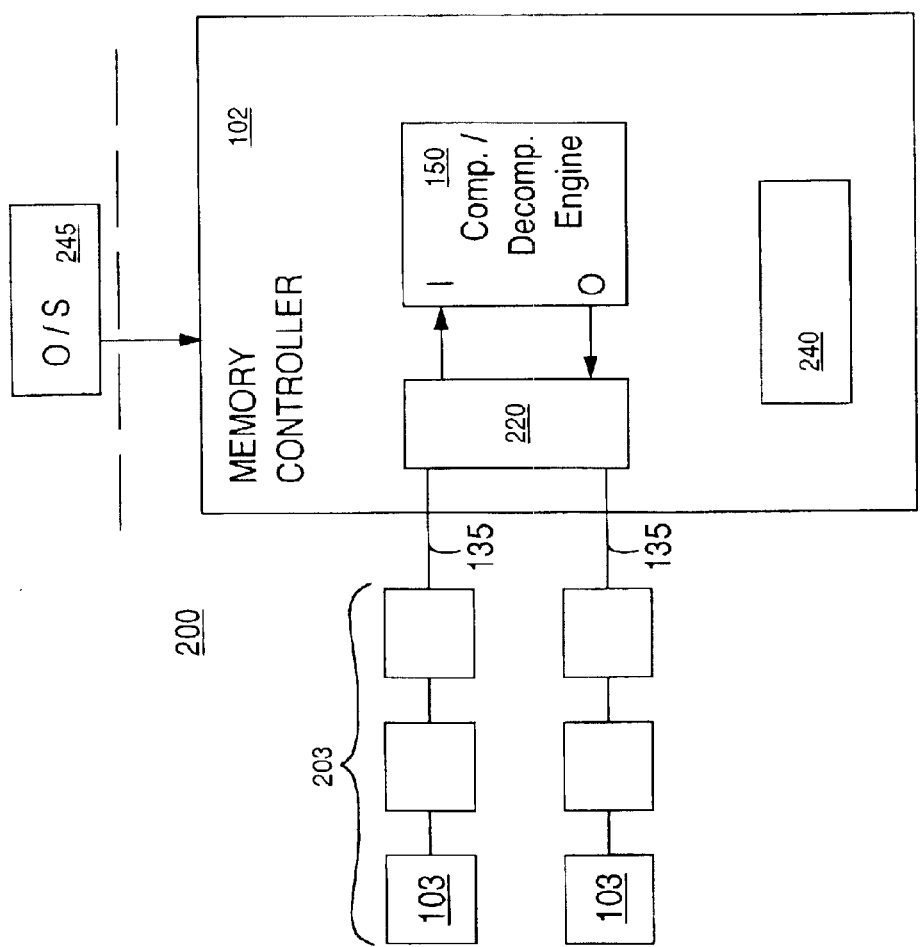
FIG. 2 illustrates a block diagram of a memory controller and memory chains, in accordance with embodiments of the present invention.

FIG. 2 illustrates another embodiment of a system 200 for compressing and decompressing data. In FIG. 2, two memory chains 203 are shown coupled to the memory controller 102. The memory controller 102 is shown with selection logic 220 coupled to the compression/decompression engine 150 and to the data busses 135. In this fashion, the selection logic 220 is able to couple one of the data busses 135 to an input (I) of the compression/decompression engine 150 and another data bus 135 to an output (O) of the compression/decompression engine 150. The system 200 may be configured to transfer a first portion of data on the first data bus 135 to the input while transferring a second portion of the data on the data bus 135 from the output. FIG. 2 also shows control logic 240 in the memory controller 102, which may be used to determine which memory location should be read and which memory location written. For example, the control logic 240 may be for directing transfer of data from the one memory array 103 via one data bus 135 to be processed by the compression/decompression logic 150 and then transferred to another memory array 103 via another data bus 135.

Figure 3:
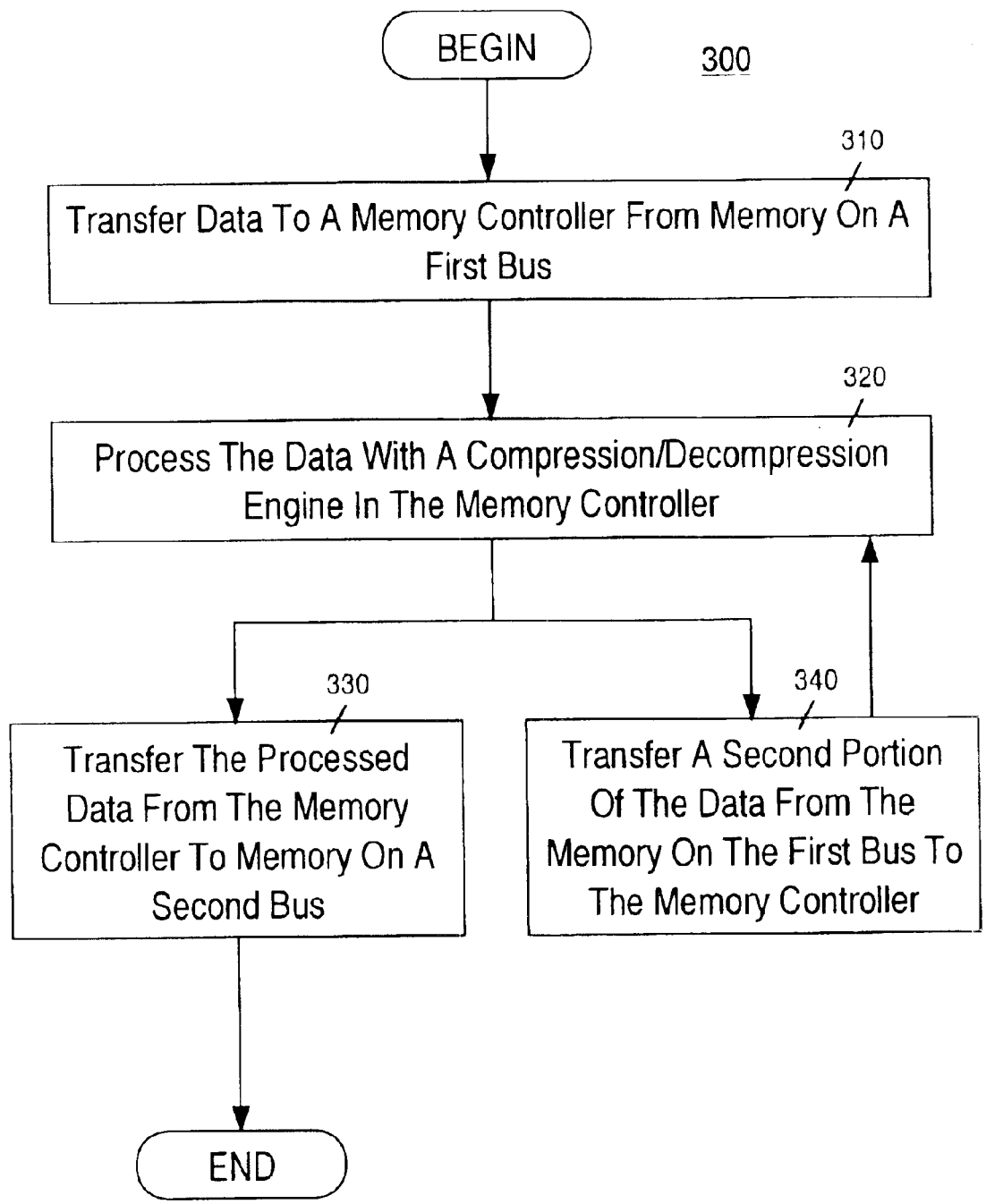
FIG. 3 is a flowchart illustrating steps of a process of compressing/decompressing data in main memory, in accordance with embodiments of the present invention.

Referring now to Process 300 of FIG. 3, an embodiment provides for a method of compressing/decompressing data that may be stored in main memory (e.g., memory array 103). In step 310, data is transferred to the memory controller 102 from a first memory location (e.g., selected data within memory array 103a) on a first data bus 135a. This step may comprise selecting the first data bus 135a in some fashion and coupling the first data bus 135a to an input of the compression/decompression engine 150. In this fashion, data from a memory location that is external to the memory controller 102 may be transferred from the first data bus 135a to the compression/decompression engine 150.

In step 320, the data is processed (e.g., either compressed or decompressed) by the compression/decompression engine 150.

In step 330, processed data is transferred from the memory controller 102 to a second memory location (e.g., a specific location in memory array 103b) on a second memory bus (e.g., bus 135b). This step may comprise selecting the second bus 135b and coupling it to an output of the compression/decompression engine 150.

While step 330 is being performed, step 340 may also be performed in which additional data is transferred from the memory location on the first data bus 135a to the memory controller 102. Thus, while a first portion of the data is being transferred on the second data bus 135b in step 330, a second portion of the data is being transferred from the first memory 103a on the first bus 135a to the memory controller 102. The data may be a full page, a portion thereof, or multiple pages. Therefore, the second portion of the data that is on the second bus 135b while the first portion is on the first bus 135a may a portion of the same page, a different page of a multiple page transaction, etc.

After performing step 340 of transferring more data from the fist bus 135a to the memory controller 102, step 320 may be performed again, in which case that data is processed by the compression/decompression engine 150. Step 330 is then performed again, with perhaps step 340 being performed. Eventually all the data from the first memory 103a that is to be processed is exhausted and the process 300 ends.

Steps of process 300 may be stated alternatively as transferring to a memory controller 102 uncompressed data from a first memory location (e.g., memory array 103a) on a first data bus 135a; loading the uncompressed data into a compression/decompression engine 150 within the memory controller 102 from the first data bus 135a while unloading compressed data from the compression/decompression engine 150 to a second data bus 135b coupled to the memory controller 102; and, transferring the compressed data to a second memory location (e.g., memory array 103b) on the second data bus 135b.

Because the compression/decompression engine 150 may be located in-line with the memory data busses 135 and may perform at memory bus speeds, compression/decompression may add only a small latency to the normal copy of a physical memory page.

The foregoing descriptions of specific embodiments of the present invention have been presented for purposes of illustration and description. They are not intended to be exhaustive or to limit the invention to the precise forms disclosed. Modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A system for compressing/decompressing data, comprising:
   a memory controller having compression/decompression logic;
   a first memory array coupled to said memory controller via a first bus;
   a second memory array coupled to said memory controller via a second bus; and
   logic for directing transfer of data from said first memory array via said first bus to be processed by said compression/decompression logic and then transferred to said second memory array via said second bus.

2. The system of claim 1, wherein a first portion of said data are transferred on said first bus while a second portion of said data are transferred on said second bus.

3. The system of claim 2, wherein said data comprises a page, and further wherein said system is operable to transfer a first portion of said page uncompressed on said first bus while a second portion of said page is being transferred compressed on said second bus.

4. The system of claim 2, wherein said data comprises a portion of a page, and further wherein said system is operable to transfer said first portion of said data uncompressed on said first bus while said second portion of said data is being transferred compressed on said second bus.

5. The system of claim 2, wherein said data comprises a plurality of pages associated with a compression transaction, and further wherein said system is operable to transfer a first of said pages uncompressed on said first bus while a second of said pages is transferred compressed on said second bus.

6. The system of claim 1, wherein:
   said first bus is dedicated to transferring uncompressed data.

7. The system of claim 1, wherein:
   said second bus is dedicated to transferring compressed data.

8. The system of claim 1, further comprising:
   at least a second memory array coupled to said first bus, wherein said first bus has a plurality of memory arrays coupled thereto.

9. The system of claim 8, further comprising:
   at least a second memory array coupled to said second bus, wherein said second bus has a plurality of memory arrays coupled thereto.

10. The system of claim 9, wherein:
    at least one of said memory arrays coupled to said first bus is dedicated to storing compressed data.

11. The system of claim 1, wherein said logic for directing said transfer is implemented within said memory controller.

12. The system of claim 1, wherein said logic for directing said transfer is implemented by an operating system.

13. A method of performing decompression, comprising:
   a) transferring data via a first bus to a memory controller from a first memory location;
   b) uncompressing said data within said memory controller; and
   c) transferring said data from said memory controller via a second bus to a second memory location.

14. The method of claim 13, further comprising:
   d) while a first portion of said data is being transferred on said second bus in said c), transferring a second portion of said data from said first memory location via said first bus to said memory controller.

15. The method of claim 13, wherein said a) comprises selecting said first bus and coupling said first bus to a decompression engine in said memory controller, wherein said data is transferred via said first bus to said decompression engine.

16. The method of claim 15, wherein said c) comprises selecting said second bus and coupling said second bus to said decompression engine, wherein said data is transferred from said decompression engine to said second memory location via said second bus.

17. A method of compressing data in main memory, comprising:
- a) transferring to a memory controller uncompressed data from a first memory location on a first bus, wherein said first memory location is external to said memory controller;
- b) loading said uncompressed data into a compression engine within said memory controller from said first bus while unloading compressed data from said engine to a second bus coupled to said memory controller; and
- c) transferring said compressed data to a second memory location on said second bus, wherein said second memory location is external to said memory controller.

18. The method of claim 17, further comprising:
- d) while a first portion of said data is being transferred via said second bus in said c), transferring a second portion of said data from said first memory location via said first bus to said memory controller.

19. The method of claim 18, wherein said b) comprises selecting said first bus and coupling said first bus to said compression engine.

20. The method of claim 19, wherein said b) further comprises selecting said second bus and coupling said second bus to said compression engine.

21. A system for compressing/decompressing data, comprising:
- a memory controller having compression/decompression logic;
- said compression/decompression logic having an input and an output;
- a plurality of busses coupled to said memory controller, said busses having memory coupled thereto;
- selection logic coupled to said plurality of busses and to said compression/decompression logic, said selection logic for selecting and coupling a first of said busses to said compression/decompression input and further for selecting and coupling a second of said busses to said compression/decompression output; and
- said system configured to transfer a first portion of data from a first memory location in said memory via said first bus to said input while transferring a second portion of said data to a second memory location in said memory via said second bus from said output.

22. The system of claim 21, wherein said plurality of busses comprise a RAMBUS architecture.

23. The system of claim 21, wherein said compression/decompression logic is hardware implemented.

24. The system of claim 21, wherein said compression/decompression logic is software implemented.

25. The system of claim 21, wherein said data comprises a page, and further wherein said system is operable to transfer a first portion of said page on said first bus in uncompressed form while transferring a second portion of said on said second bus in compressed form.

26. The system of claim 21, wherein said data comprises a plurality of pages associated with a compression transaction; and further wherein said system is operable to transfer a first page of data on said first bus in uncompressed form while transferring a second page on said second bus in compressed form.

27. The system of claim 21, wherein said data comprises a portion of a page associated with a compression transaction, and further wherein said system is operable to transfer a first portion of said data uncompressed on said first bus while transferring a second portion of said data compressed on said second bus.

28. The system of claim 21, wherein said memory controller is operable to access said memory by issuing control signals to said memory.

29. The system of claim 21, wherein said control signals comprise a row address strobe and a column address strobe.

30. The system of claim 21, wherein said memory is for implementing a computer main memory.

* * * * *